March 21, 1961 L. E. KOCH 2,975,618
CONTINUOUS FREEZER
Filed Dec. 30, 1959 3 Sheets-Sheet 1

INVENTOR.
L. E. Koch
BY
Lieber, Lieber & Nilles
Attorneys

INVENTOR.
L. E. Koch
BY
Lieber Lieber & Nilles
Attorneys

March 21, 1961 L. E. KOCH 2,975,618
CONTINUOUS FREEZER
Filed Dec. 30, 1959 3 Sheets-Sheet 3
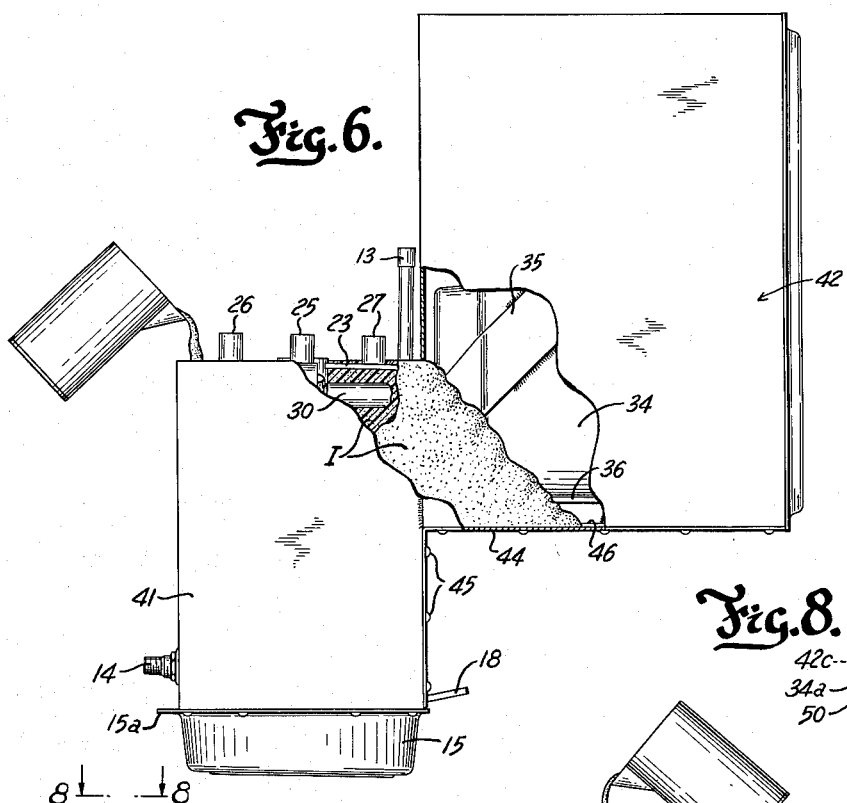
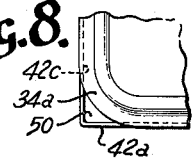
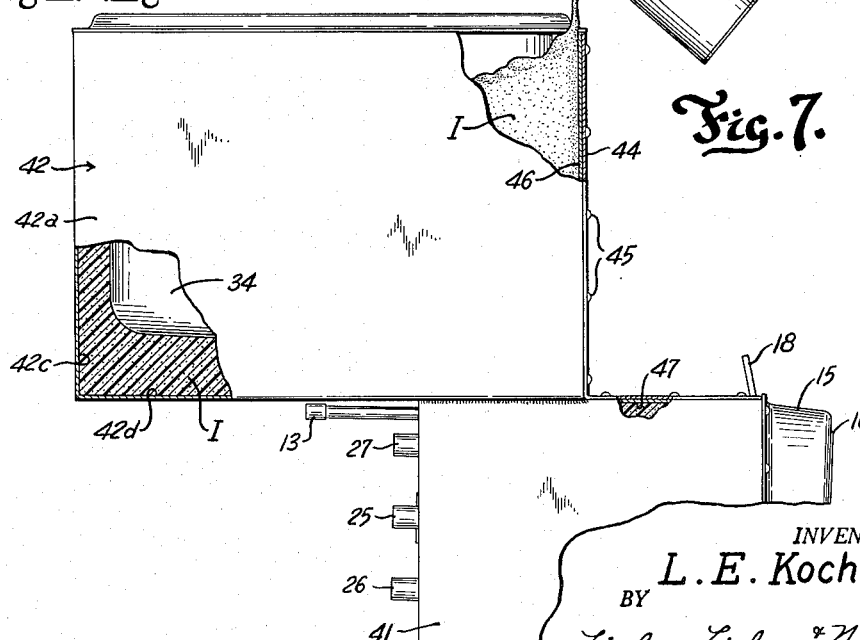
INVENTOR.
L. E. Koch
BY Lieber, Lieber & Nilles
Attorneys

2,975,618
CONTINUOUS FREEZER

Lawrence E. Koch, Beloit, Wis., assignor to
Louis A. M. Phelan, Rockton, Ill.

Filed Dec. 30, 1959, Ser. No. 862,899

2 Claims. (Cl. 62—342)

This invention relates generally to continuous freezers for soft ice cream, malteds, custards and the like. In freezers of this character, a supply tank is connected in mix delivering communication with the freezer cylinder so as to be able to continuously furnish fresh mix to the cylinder as the finished product is drawn therefrom.

The ability of such a continuous freezer to maintain the product at a definite temperature is particularly important in order that the product served will "stand up" in appealing form and will also have the desired texture and other characteristics. A temperature variation of only about one-half degree Fahrenheit is tolerable for the product about to be drawn from the serving valve at the discharge end of the cylinder. The problems of maintaining and sensing this temperature are fully described in my co-pending U. S. application Serial Number 589,290, filed June 4, 1956, now issued as Patent No. 2,930,203, on March 29, 1960, and entitled "Temperature Control System for Freezers," and reference may be had to that application, if deemed necessary or desirable, for a more complete understanding of these problems.

The fresh mix tank contains the liquid mix supply which is automatically fed into the freezing chamber by means of the feed principle disclosed in the co-pending U.S. application of Louis A. M. Phelan, Serial Number 569,769, filed March 6, 1956, now issued as Patent No. 2,947,155, on August 2, 1960, and entitled, "Automatic Feed for Ice Cream and the like Freezers" and reference may be had to that application if thought to be necessary. It is believed sufficient to say, for purposes of this disclosure, that the freezer cylinder and mix tank are assembled as a one-piece unit and the tank is refrigerated by conduction from the freezer cylinder. The fresh mix is introduced into the rear end of the cylinder, which end is not surrounded by refrigerating coils and thereby mix inlet into the cylinder is never rendered inoperative by being frozen shut.

With a continuous freezer as above described, it is necessary to provide maximum insulating qualities, not only for the freezer cylinder itself but also for the supply tank in order to keep the fresh mix cool, and also for the feed conduit from the supply tank to the freezer cylinder in order for the tank to be cooled by conduction from the cylinder. Metal to metal contact should be avoided as much as possible between the above described assembled unit and its supporting framework and at the same time good mechanical support must be provided not only for the entire unit, but also between the freezer cylinder and supply tank. In addition, the irregular shapes of the numerous conduits and other fittings extending from the freezer cylinder must be thoroughly and uniformly insulated.

In accordance with the above requirements, a continuous freezer assembly has been provided which provides maximum insulating value for the various component parts and which also provides good mechanical support for the assembled unit.

More particularly, the present invention utilizes a self-supporting insulation which eliminates practically all metal-to-metal contact between the assembled freezer unit and its supporting frame and holds the parts rigidly in place. This insulation is of the type that can be poured into a space between the assembled unit and an outer container and serves to hold them in rigid, spaced relationship.

These and other objects and advantages of the present invention will appear hereinafter as this disclosure progresses, reference being had to the accompanying drawings in which:

Figure 6 is an elevational view of the device shown in Figure 3 but tipped up on its front end as when the initial pour of insulating material is being made, certain parts being shown as broken away and in section;

Figure 7 is a view similar to Figure 6 but showing the device in its normal position and when the second and last pour of insulation is being made; and Figure 8 is a fragmentary plan view showing the detail of the corner.

Freezer cylinder

Figure 1:
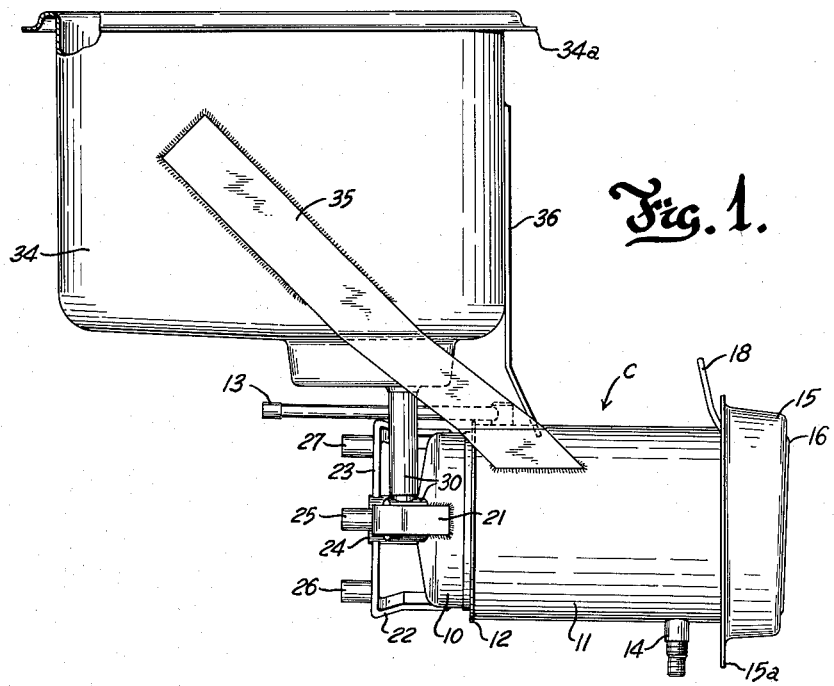
Figure 1 is a side elevational view, with a part broken away, of an assembled freezer cylinder and supply tank unit of the type with which the present invention is concerned.

Referring in greater detail to the drawings, the freezer cylinder C includes a cylindrical shell 10 having a refrigerant jacket 11 concentric therewith and which extends along the majority of its length and terminates at 12. Refrigerant inlet and outlet conduits 13 and 14, respectively, introduce the refrigerant to and remove it from the annular space provided between the shell and its jacket.

A sheet metal collar 15 surrounds the front portion of the jacket 11 and has an integrally formed flange 15a extending radially from its rear edge. This collar is secured at its front edge as by welding at 16, to the front end of shell 10.

A tubular well 18 surrounds the front end of the shell and its free upper end extending upwardly therefrom and into which a temeprature control bulb (not shown) may be inserted in accordance with said application Serial Number 589,290.

Figure 2:
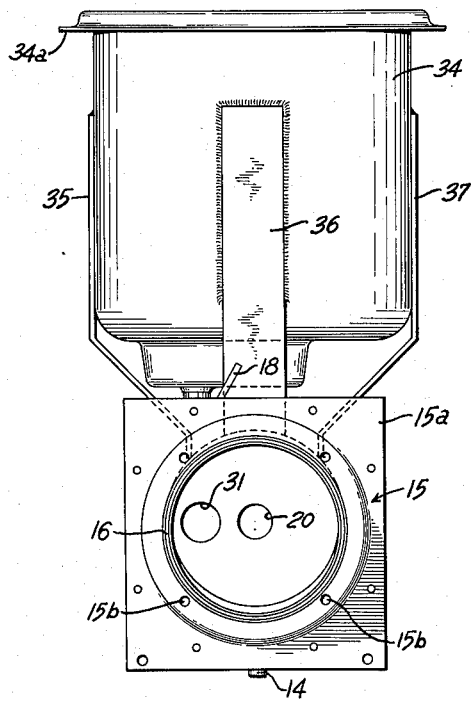
Figure 2 is a front view of the Figure 1 unit.

As shown in Figure 2, the front side of collar 15 has four apertures 15b which receive fastening means (not shown) for securing a cover and serving valve arrangement (not shown) to the open front end of the freezer shell. If a more complete description of the front cover and serving valve is desired for any reason, reference may be had to U.S. Patent 2,916,044, which issued on December 8, 1959, and which is entitled, "Cover and Serving Valve For Freezers."

Means are provided at the rear end of the freezer shell 10 for mounting the transmission (not shown) that drives the rotary beater (not shown) that is located within the freezer cylinder. An example of such a transmission may be found in the U.S. patent to Phelan Number 2,314,598, issued on March 23, 1943, and the type of beater is fully described in the Phelan Patent Number 2,810,557, issued on October 22, 1957. It is believed adequate to say for present purposes, however, that a drive shaft (not shown) extends through an opening 20 (Fig. 2) in the rear wall of the freezer shell. The means for mounting the transmission comprises the three brackets 21, 22 and 23 which are welded to the rear portion of the shell and are also welded to the central bearing member 24 through which the transmission shaft extends. This mounting means also includes the tapped studs 25, 26 and 27 which are welded to brackets 21, 22 and 23, respectively, and extend rearwardly therefrom. Thus the transmission is secured by suitable bolts (not shown) which are threadably engageable in the studs.

A fresh mix conduit 30 extends rearwardly and then upwardly from the rear end of shell 10 and communicates therewith via inlet 31 (Fig. 2). The upper end of this conduit is in communication with a fresh mix supply tank 34, now to be described.

Supply tank

The supply tank 34 is formed preferably by a deep-draw process which results in an integrally formed and outwardly extending flange 34a around its upper end. Three copper straps 35, 36 and 37 are welded to the tank and to the jacket 11 so as to secure them together. A cover (not shown) may be provided for the tank and would rest on the upper edge thereof.

Container

Figure 3:
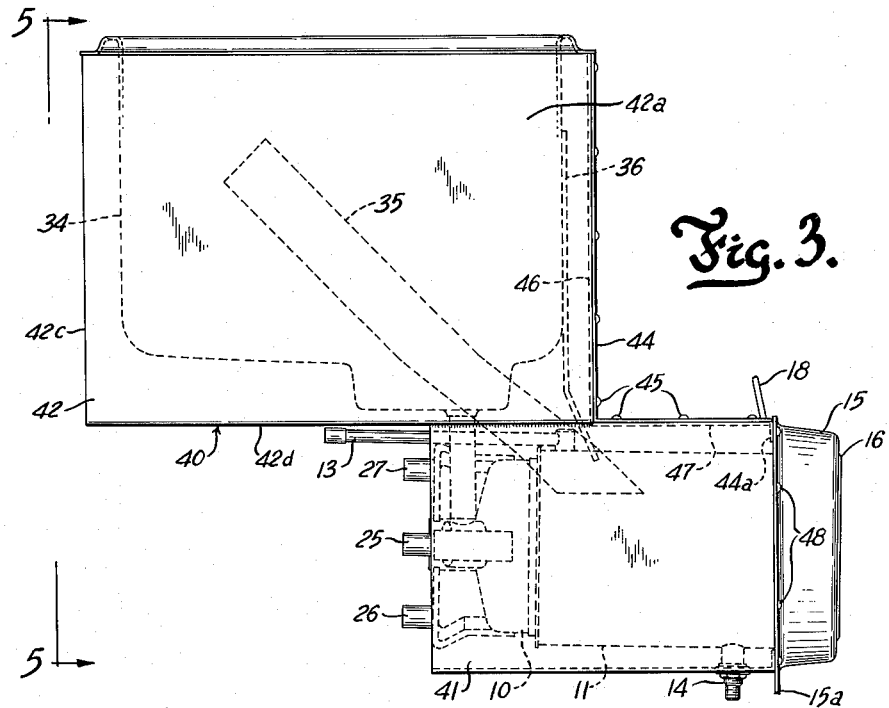
Figure 3 is a side elevational view of the unit of Figure 1 as installed in an insulation defining container and before the insulation is poured into the space between the unit and the container.
Figure 5:
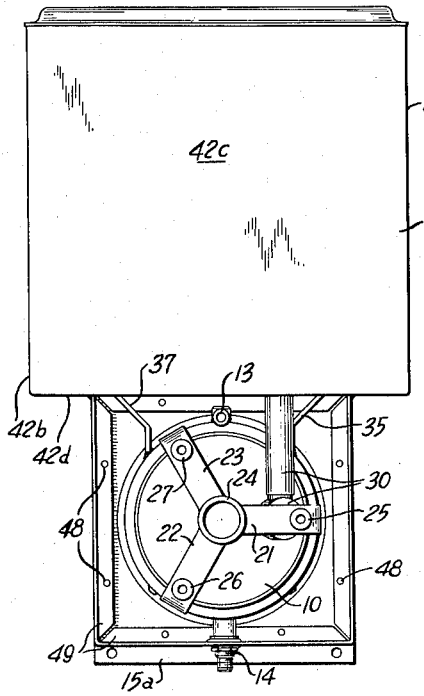
Figure 5 is a rear elevational view taken along line 5—5 in Figure 3.
Figure 4:
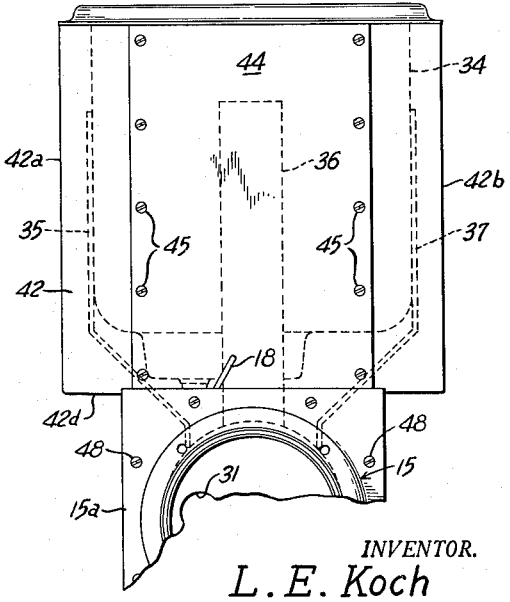
Figure 4 is a front elevation of the device as shown in Figure 3; a portion being shown as broken away.

Referring now to Figures 3–5, an outer container 40 is provided which encloses the cylinder and tank unit. In addition to protecting the insulation within it, the container acts to support various controls that are subsequently fastened to it.

This container is preferably formed from sheet metal and includes a lower portion 41 surrounding the cylinder and an upper portion 42 surrounding the tank. These portions are secured together as by welding, for example.

The upper portion 42 comprises side walls 42a, and 42b, a rear will 42c and a bottom wall 42d, the bottom wall being cut away in that part of its area above the lower portion 41 so as to be in communication therewith. The top of container portion 42 is open so that the supply tank protrudes above it.

The lower portion 41 consists of side walls 41a, 41b and bottom 41c. The rear end of portion 41 is open, as shown in Figure 5.

An enclosing L-shaped plate 44 is secured across the open front side of portion 42 and across the front part of the open top of portion 41. The plate is secured by screws 45 which engage inwardly turned flanges 46 and 47 (Fig. 7), and is fastened in place after the cylinder and tank unit has been inserted into the container from the right end (as viewed in Figure 3).

In this manner the unit is fully assembled and then inserted in its container 40. The plate 44 is then screwed in place.

Then the collar 15 is also secured to portion 41 and plate 44 by means of screws 48 which extend through inwardly turned flanges 49 (Fig. 5) on the front end of container portion 41, and flange 44a.

When the cylinder-tank unit has been thus secured in the container, the space between the unit and container is ready to be completely filled with a rigid insulation which anchors the unit in place and completely fills this space. All parts to which still other components are to be attached extend outwardly from the container. For example, tube well 18, inlet and outlet conduits 13 and 14, support lugs 25, 26 and 27 and shaft bearing 24 are left exposed. This insulation filling will be described presently. As previously mentioned, the sheet metal container 40 acts to protect the brittle insulation from damage, furnishes a good support for controls fastened thereto and it furthermore permits immediate removal of the entire assembly from the insulation applying area as soon as the insulation has been poured, thus contributing to good production rates.

Insulation

The insulation used with the present invention is of the type that is in liquid form when mixed and, after mixing, the ingredients react when subjected to temperatures above room temperature. This heat may be applied externally, or the ingredients may be of the type that generate their own heat. In either event, this chemical reaction causes foaming, and results in a cellular or foamed plastic having particularly good insulating qualities.

One type of insulation which is particularly desirable is known as "Freon-Blown Rigid Urethane Foam" which is rigid and self-supporting when set and adheres strongly to anything it comes in contact with. It is hard and brittle when completely set and therefore a metal container, rather than paperboard, for example, is preferred in order to protect the outer surfaces from damage. This foam acts to tightly seal all joints, is light in weight, and is very low in moisture retention.

An example of the ingredients of this particular type of insulation includes (1) a resin such as poly-ester, poly ether, phenolic, epoxy or other resins having tolylene diisocyanate in them, (2) Freon 11, (3) a water soluble silicon, and (4) a catalyst such as dimethyl ethanolamine.

Regardless of the specific ingredients used, the resulting plastic should be non-shrinking when cooled, or at least substantially so, to thereby hold to a minimum the number of pours required.

The pour

The process for applying the insulation in the container and after the cylinder-tank unit has been assembled therein will now be described.

The insulation contemplated for use with this invention stiffens or sets rather rapidly after it has been mixed and poured. It takes a longer time to completely harden, however, but it is of a high coefficient of viscosity shortly after being poured and when it has finished foaming and expanding into every minute crack and joint.

The assembly shown in Figures 6 and 7 is filled with insulation I preferably in two stages or pours. The first pour is made with the assembly tipped up on its front end, as shown in Figure 6. The liquid insulation is poured into the open rear end of container portion 41 until it reaches the level of the upper end of this portion and the material also flows over into container 42 as indicated. By this time the insulation is sufficiently "stiff" so that further flow into container 42 does not occur. The assembly is then turned to its normal position as shown in Figure 7 and the second phase of pouring is made through the open four corners 50 shown in Figure 8. The insulation brought up to the level of the top edge of container portion 42 and any excess that foams out of these open corners and over and above this level is trimmed off after hardening. Due to the non-shrinking characteristics of the insulation, additional pours are unnecessary.

Immediately upon completion of the second pour the assembly can be moved to a different location without any delay while waiting for the insulation to harden.

Summary

The insulated freezer assembly is a complete, permanently assembled and integral package. The cylinder, tank and associated parts are thoroughly and exceptionally well insulated, are firmly embedded in the rigid insulation, and metal-to-metal contact with the container or other parts has been held to a minimum. A sufficient amount of cold conduction is possible from the cylinder to the supply tank and yet the supply conduit will not become sufficiently cold to retard fresh mix flow or freezing shut of the mix inlet.

The cylinder and tank can be completely and permanently assembled before insertion in the container, the container then can be readily closed by securing the L-shaped plate in place, and the cylinder collar then secured to the container. After the insulation is poured in place the assembly can be moved and the insulation itself provides the mechanical support for the cylinder-tank unit within the container.

Various modes of carrying out the invention are contemplated as being within the scope of the following claims particularly pointing out and distinctly claiming the subject matter which is regarded as the invention.

I claim:

1. A continuous freezer comprising, a freezing cylinder, a fresh-mix supply tank in mix delivering communication with said cylinder and rigidly secured thereto by strap means to form a cylinder-tank unit, a container for said unit and substantially enclosing the latter and forming an enclosed space therewith, and a rigid and self-supporting insulation of the cellular plastic type in said space between said unit and container, said insulation rigidly supporting said cylinder and said tank with respect to one another and also in respect to said container.

2. A continuous freezer comprising, a freezing cylinder, a fresh-mix supply tank, a feed conduit for placing said tank in mix delivering communication with said cylinder and spaced from the latter, said tank being rigidly secured to said cylinder to form a cylinder-tank unit, a container for said unit and substantially enclosing the latter and forming an enclosed space therewith, and a freon-blown rigid urethane foam insulation in said space between said conduit and cylinder and also between said unit and container, said insulation rigidly supporting said cylinder and said tank with respect to one another and also in respect to said container.

References Cited in the file of this patent
UNITED STATES PATENTS

| | | |
|---|---|---|
| 2,552,641 | Morrison | May 15, 1951 |
| 2,653,139 | Sterling | Sept. 22, 1953 |
| 2,737,024 | Swenson | Mar. 6, 1956 |

OTHER REFERENCES

Foamed Isocyanates, February 1955, Product Engineering, pages 140–143.